(12) United States Patent
Burton-Wilcock et al.

(10) Patent No.: US 8,974,846 B2
(45) Date of Patent: Mar. 10, 2015

(54) BEVERAGE PREPARATION MACHINES AND METHODS FOR OPERATING BEVERAGE PREPARATION MACHINES

(75) Inventors: Gary Vincent Burton-Wilcock, Kidlington (GB); David Paul Short, Banbury (GB); Paul John Newcombe, High Wycombe (GB)

(73) Assignee: Kraft Foods R & D, Inc., Deerfield, IL (US)

( * ) Notice: Subject to any disclaimer, the term of this patent is extended or adjusted under 35 U.S.C. 154(b) by 539 days.

(21) Appl. No.: 12/600,472

(22) PCT Filed: May 16, 2008
(Under 37 CFR 1.47)

(86) PCT No.: PCT/US2008/063833
§ 371 (c)(1),
(2), (4) Date: Sep. 8, 2010

(87) PCT Pub. No.: WO2008/144471
PCT Pub. Date: Nov. 27, 2008

(65) Prior Publication Data
US 2011/0070348 A1 Mar. 24, 2011

Related U.S. Application Data

(60) Provisional application No. 60/940,118, filed on May 25, 2007.

(30) Foreign Application Priority Data

May 18, 2007 (GB) .................................. 0709588.8

(51) Int. Cl.
| | | |
|---|---|---|
| *A47J 31/44* | (2006.01) | |
| *A23F 3/18* | (2006.01) | |
| *A23F 5/26* | (2006.01) | |
| *A47J 31/46* | (2006.01) | |
| *A47J 31/52* | (2006.01) | |
| *A47J 31/54* | (2006.01) | |
| *A47J 31/36* | (2006.01) | |

(52) U.S. Cl.
CPC .... *A47J 31/46* (2013.01); *A47J 31/52* (2013.01); *A47J 31/54* (2013.01); *A47J 31/36* (2013.01)
USPC ............................................ 426/431; 99/281

(58) Field of Classification Search
USPC ...................................... 426/431; 99/275, 281
See application file for complete search history.

(56) References Cited

U.S. PATENT DOCUMENTS

| | | |
|---|---|---|
| 2,243,895 A | 6/1941 | Brown |
| 2,715,868 A | 8/1955 | Brown |
| 2,899,106 A | 8/1959 | Weinert |
| 3,292,527 A | 12/1966 | Stasse |
| 3,336,857 A | 8/1967 | Knodt et al. |
| 3,403,617 A | 10/1968 | Lampe |
| 3,607,297 A | 9/1971 | Fasano et al. |
| 3,805,999 A | 4/1974 | Syverson |
| 4,083,295 A * | 4/1978 | Hollingsworth ................ 99/283 |
| D255,529 S | 6/1980 | Dziekonski |
| 4,206,694 A | 6/1980 | Moskowitz et al. |
| 4,253,385 A | 3/1981 | Illy |
| 4,353,293 A * | 10/1982 | Illy ................................ 99/283 |
| 4,382,402 A | 5/1983 | Alvarez |
| 4,389,191 A | 6/1983 | Lowe |
| 4,452,130 A | 6/1984 | Klein |
| 4,484,515 A | 11/1984 | Illy |
| 4,551,611 A | 11/1985 | Longo |
| 4,653,390 A | 3/1987 | Hayes |
| 4,724,752 A | 2/1988 | Aliesch et al. |
| 4,738,378 A | 4/1988 | Oakley et al. |
| 4,744,291 A | 5/1988 | Wallin |
| 4,775,048 A | 10/1988 | Baecchi et al. |
| 4,787,299 A | 11/1988 | Levi et al. |
| 4,838,152 A | 6/1989 | Kubicko et al. |
| 4,846,052 A | 7/1989 | Favre et al. |
| 4,873,915 A | 10/1989 | Newman et al. |

(Continued)

FOREIGN PATENT DOCUMENTS

| | | |
|---|---|---|
| CA | 2684130 C | 3/2005 |
| EP | 0 151 252 A1 | 8/1985 |

(Continued)

OTHER PUBLICATIONS

European Patent Office Search Report for European Application EP 04 25 0357.3 dated May 11, 2004, 3 pages.

(Continued)

*Primary Examiner* — Humera Sheikh
*Assistant Examiner* — Bhaskar Mukhopadhyay
(74) *Attorney, Agent, or Firm* — Fitch, Even, Tabin & Flannery LLP

(57) ABSTRACT

A method of operating a beverage preparation machine, the beverage preparation machine being of the type comprising a brewer comprising: a reservoir containing water; a delivery head for receiving in use a cartridge containing one or more beverage ingredients; a pump for pumping water from said reservoir to said delivery head; a primary heater for heating the water contained in said reservoir; a secondary heater in between the reservoir and the delivery head; a controller for controlling energization of the primary heater and the secondary heater; and wherein the controller operates to prevent energization of the primary heater simultaneous with energization of the secondary heater. An apparatus for carrying out the method is also disclosed and methods and apparatus utilizing first and second brewers.

14 Claims, 5 Drawing Sheets

(56) References Cited

U.S. PATENT DOCUMENTS

| | | |
|---|---|---|
| 4,875,408 A | 10/1989 | McGee |
| 4,876,953 A | 10/1989 | Imamura et al. |
| 4,917,005 A | 4/1990 | Knepler |
| 4,920,252 A | 4/1990 | Yoshino |
| 4,920,870 A | 5/1990 | Newman et al. |
| 4,921,712 A | 5/1990 | Malmquist |
| 4,990,352 A | 2/1991 | Newman et al. |
| D316,795 S | 5/1991 | Brewer |
| 5,014,611 A | 5/1991 | Illy et al. |
| 5,063,836 A | 11/1991 | Patel |
| 5,072,660 A | 12/1991 | Helbling |
| 5,080,008 A | 1/1992 | Helbling |
| 5,111,740 A | 5/1992 | Klein |
| 5,134,924 A | 8/1992 | Vicker |
| 5,178,058 A | 1/1993 | van Dort et al. |
| 5,183,998 A | 2/1993 | Hoffman et al. |
| 5,186,096 A | 2/1993 | Willi |
| 5,197,374 A | 3/1993 | Fond |
| 5,242,702 A | 9/1993 | Fond |
| 5,259,295 A | 11/1993 | Timm |
| 5,265,520 A | 11/1993 | Giuliano |
| 5,272,960 A | 12/1993 | Kinna |
| 5,285,717 A | 2/1994 | Knepler |
| 5,287,797 A | 2/1994 | Grykiewicz et al. |
| 5,303,639 A | 4/1994 | Bunn et al. |
| 5,327,815 A | 7/1994 | Fond et al. |
| 5,343,799 A | 9/1994 | Fond |
| 5,347,916 A | 9/1994 | Fond et al. |
| 5,349,897 A | 9/1994 | King et al. |
| 5,375,508 A | 12/1994 | Knepler et al. |
| 5,398,595 A | 3/1995 | Fond et al. |
| 5,398,596 A | 3/1995 | Fond |
| 5,408,917 A | 4/1995 | Lussi |
| 5,440,972 A | 8/1995 | English |
| 5,455,887 A | 10/1995 | Dam |
| 5,463,932 A | 11/1995 | Olson |
| 5,472,719 A | 12/1995 | Favre |
| 5,479,849 A | 1/1996 | King et al. |
| 5,531,152 A | 7/1996 | Gardosi |
| 5,549,035 A | 8/1996 | Wing-Chung |
| 5,551,331 A | 9/1996 | Pfeifer et al. |
| 5,603,254 A | 2/1997 | Fond et al. |
| 5,638,740 A | 6/1997 | Cai |
| 5,638,741 A | 6/1997 | Cisaria |
| 5,639,023 A | 6/1997 | Hild et al. |
| 5,649,472 A | 7/1997 | Fond et al. |
| D389,694 S | 1/1998 | Vinson |
| 5,704,275 A | 1/1998 | Warne |
| 5,738,001 A | 4/1998 | Liverani |
| 5,755,149 A | 5/1998 | Blanc et al. |
| 5,762,987 A | 6/1998 | Fond et al. |
| 5,776,527 A | 7/1998 | Blanc |
| 5,794,519 A | 8/1998 | Fischer |
| 5,826,492 A | 10/1998 | Fond et al. |
| 5,840,189 A | 11/1998 | Sylvan et al. |
| 5,858,437 A | 1/1999 | Anson |
| 5,860,354 A | 1/1999 | Jouatel et al. |
| 5,862,738 A | 1/1999 | Warne |
| 5,897,899 A | 4/1999 | Fond |
| 5,899,137 A | 5/1999 | Miller et al. |
| 5,921,168 A | 7/1999 | Nello |
| 5,943,944 A | 8/1999 | Lassota |
| 5,953,981 A | 9/1999 | Lassota |
| 5,967,021 A | 10/1999 | Yung |
| 5,974,950 A | 11/1999 | King |
| 5,992,298 A | 11/1999 | Illy et al. |
| 6,000,317 A | 12/1999 | Van Der Meer |
| 6,006,653 A | 12/1999 | Sham et al. |
| 6,009,792 A | 1/2000 | Kraan |
| D419,821 S | 2/2000 | Powell et al. |
| 6,021,705 A | 2/2000 | Dijs |
| D423,863 S | 5/2000 | Lupi |
| 6,062,127 A | 5/2000 | Klosinski et al. |
| 6,082,245 A | 7/2000 | Nicolai |
| 6,095,031 A | 8/2000 | Warne |
| 6,098,525 A | 8/2000 | Gijzel et al. |
| 6,109,168 A | 8/2000 | Illy et al. |
| 6,117,471 A | 9/2000 | King |
| 6,142,063 A | 11/2000 | Beaullieu et al. |
| 6,158,328 A | 12/2000 | Cai |
| 6,170,386 B1 | 1/2001 | Paul |
| 6,173,117 B1 | 1/2001 | Clubb |
| 6,178,874 B1 | 1/2001 | Joergensen |
| 6,182,554 B1 | 2/2001 | Beaulieu et al. |
| 6,186,051 B1 | 2/2001 | Aarts |
| D443,792 S | 6/2001 | Peters et al. |
| 6,240,832 B1 | 6/2001 | Schmed et al. |
| 6,240,833 B1 | 6/2001 | Sham et al. |
| 6,245,371 B1 | 6/2001 | Gutwein et al. |
| 6,279,459 B1 | 8/2001 | Mork et al. |
| 6,289,948 B1 | 9/2001 | Jeannin et al. |
| D452,107 S | 12/2001 | Cahen |
| D454,466 S | 3/2002 | Hong |
| 6,405,637 B1 | 6/2002 | Cai |
| D459,628 S | 7/2002 | Cahen |
| D460,653 S | 7/2002 | Cahen |
| D461,358 S | 8/2002 | Cahen |
| 6,499,388 B2 | 12/2002 | Schmed |
| 6,536,332 B2 | 3/2003 | Schmed |
| D475,567 S | 6/2003 | Hsu |
| 6,606,938 B2 | 8/2003 | Taylor |
| D479,939 S | 9/2003 | Au |
| 6,612,224 B2 | 9/2003 | Mercier et al. |
| 6,644,173 B2 | 11/2003 | Lazaris et al. |
| 6,698,228 B2 | 3/2004 | Kateman et al. |
| 6,698,332 B2 | 3/2004 | Kollep et al. |
| 6,698,333 B2 | 3/2004 | Halliday et al. |
| D489,930 S | 5/2004 | Tse |
| 6,759,072 B1 | 7/2004 | Gutwein et al. |
| 6,786,136 B2 | 9/2004 | Cirigliano et al. |
| D497,278 S | 10/2004 | Picozza et al. |
| 6,799,503 B2 | 10/2004 | Kollep et al. |
| 6,857,353 B2 | 2/2005 | Kollep et al. |
| D502,841 S | 3/2005 | Santer |
| 6,935,222 B2 | 8/2005 | Chen et al. |
| 6,941,855 B2 | 9/2005 | Denisart et al. |
| 6,955,116 B2 | 10/2005 | Hale |
| 7,063,238 B2 | 6/2006 | Hale |
| 7,097,074 B2 | 8/2006 | Halliday et al. |
| D530,560 S | 10/2006 | Lin |
| 7,165,488 B2 | 1/2007 | Bragg et al. |
| 7,202,449 B1 | 4/2007 | Renau |
| 7,213,506 B2 | 5/2007 | Halliday et al. |
| 7,219,598 B2 | 5/2007 | Halliday et al. |
| 7,231,869 B2 | 6/2007 | Halliday et al. |
| 7,243,598 B2 | 7/2007 | Halliday et al. |
| 7,255,039 B2 | 8/2007 | Halliday et al. |
| 7,287,461 B2 | 10/2007 | Halliday et al. |
| 7,308,851 B2 | 12/2007 | Halliday |
| 7,316,178 B2 | 1/2008 | Halliday et al. |
| 7,322,277 B2 | 1/2008 | Halliday et al. |
| 7,325,479 B2 | 2/2008 | Laigneau et al. |
| 7,328,651 B2 | 2/2008 | Halliday et al. |
| 7,340,990 B2 | 3/2008 | Halliday et al. |
| 7,418,899 B2 | 9/2008 | Halliday et al. |
| D582,714 S | 12/2008 | Hensel |
| D585,692 S | 2/2009 | Borin |
| 7,533,603 B2 | 5/2009 | Halliday et al. |
| 7,533,604 B2 | 5/2009 | Halliday et al. |
| 2002/0002913 A1 | 1/2002 | Mariller et al. |
| 2002/0023543 A1 | 2/2002 | Schmed |
| 2002/0048621 A1 | 4/2002 | Boyd et al. |
| 2002/0078831 A1 | 6/2002 | Cai |
| 2002/0121197 A1 | 9/2002 | Mercier et al. |
| 2002/0121198 A1 | 9/2002 | Kollep et al. |
| 2002/0124736 A1 | 9/2002 | Kollep et al. |
| 2002/0129712 A1 | 9/2002 | Westbrook et al. |
| 2002/0144603 A1 | 10/2002 | Taylor |
| 2002/0144604 A1 | 10/2002 | Winkler et al. |
| 2002/0148356 A1 | 10/2002 | Lazaris et al. |
| 2003/0056655 A1 | 3/2003 | Kollep et al. |
| 2003/0066431 A1 | 4/2003 | Fanzutti et al. |
| 2003/0145736 A1 | 8/2003 | Green |
| 2004/0089158 A1 | 5/2004 | Mahlich |

(56) References Cited

U.S. PATENT DOCUMENTS

| | | | |
|---|---|---|---|
| 2004/0182250 | A1 | 9/2004 | Halliday et al. |
| 2004/0191370 | A1 | 9/2004 | Halliday et al. |
| 2004/0191372 | A1 | 9/2004 | Halliday et al. |
| 2004/0197444 | A1 | 10/2004 | Halliday et al. |
| 2004/0211322 | A1 | 10/2004 | Halliday et al. |
| 2004/0228955 | A1 | 11/2004 | Denisart et al. |
| 2004/0237793 | A1 | 12/2004 | Zurcher et al. |
| 2006/0107839 | A1* | 5/2006 | Nenov et al. ............... 99/275 |
| 2006/0123998 | A1 | 6/2006 | Castellani |
| 2006/0226228 | A1 | 10/2006 | Gagne et al. |
| 2007/0104837 | A1 | 5/2007 | Yoakim et al. |
| 2008/0229932 | A1 | 9/2008 | Magg et al. |

FOREIGN PATENT DOCUMENTS

| | | |
|---|---|---|
| EP | 0 334 571 A1 | 9/1989 |
| EP | 0 334 572 A1 | 9/1989 |
| EP | 0 162 417 B1 | 3/1990 |
| EP | 0 469 162 A1 | 2/1992 |
| EP | 0 638 486 A1 | 2/1995 |
| EP | 0 604 615 B1 | 9/1998 |
| EP | 0 862 882 A1 | 9/1998 |
| EP | 0 870 457 A1 | 10/1998 |
| EP | 0 904 718 A1 | 3/1999 |
| EP | 1 090 574 A1 | 4/2001 |
| EP | 1 095 605 A1 | 5/2001 |
| EP | 1 153 561 A1 | 11/2001 |
| EP | 1 208 782 A1 | 5/2002 |
| EP | 0 862 882 B1 | 7/2002 |
| EP | 0 919 171 B1 | 1/2003 |
| EP | 1 316 283 A2 | 6/2003 |
| EP | 0 904 719 B1 | 8/2003 |
| EP | 1 669 011 A1 | 6/2006 |
| EP | 1 541 070 B1 | 11/2006 |
| EP | 1 772 398 A1 | 11/2007 |
| FR | 1 537 031 A | 8/1968 |
| GB | 468 248 | 7/1937 |
| GB | 828 529 | 2/1960 |
| GB | 1 215 840 A | 12/1970 |
| GB | 2143625 A | 2/1985 |
| GB | 2 374 795 A | 10/2002 |
| GB | 2 374 816 A | 10/2002 |
| GB | 2 374 856 A | 10/2002 |
| GB | 2 379 624 A | 3/2003 |
| GB | 2 409 965 B | 9/2005 |
| GB | 2449630 B | 6/2010 |
| JP | 2-87759 U | 7/1990 |
| JP | 05207935 | 8/1993 |
| JP | 6-18259 U | 3/1994 |
| JP | 2000-355375 A | 12/2000 |
| JP | 2006300453 A | 11/2006 |
| RU | 688175 A | 9/1979 |
| RU | 2 086 411 C1 | 8/1997 |
| RU | 2005 126 705 A | 6/2006 |
| RU | 2 283 016 C2 | 9/2006 |
| RU | 2 286 076 C2 | 10/2006 |
| WO | 95/07648 A1 | 3/1995 |
| WO | 95/16377 A1 | 6/1995 |
| WO | 97/17006 A1 | 5/1997 |
| WO | 9811809 A1 | 3/1998 |
| WO | 98/47418 A1 | 10/1998 |
| WO | 00/42891 A1 | 7/2000 |
| WO | 01/15582 A1 | 3/2001 |
| WO | 02/19875 A1 | 3/2002 |
| WO | 02/080745 A1 | 10/2002 |
| WO | 02/085170 A2 | 10/2002 |
| WO | 02/087400 A1 | 11/2002 |
| WO | 03/005295 A1 | 1/2003 |
| WO | 02/085170 A3 | 3/2003 |
| WO | 03/026470 A2 | 4/2003 |
| WO | 03/043470 A1 | 5/2003 |
| WO | 03/053200 A1 | 7/2003 |
| WO | 03/059778 A3 | 7/2003 |
| WO | 03/065859 A2 | 8/2003 |
| WO | 03/065859 A3 | 12/2003 |
| WO | 2006127108 A2 | 11/2006 |

OTHER PUBLICATIONS

European Patent Office Search Report for European Application EP 04 25 0360.7 dated May 7, 2004, 3 pages.
European Patent Office Search Report for European Application EP 04 25 0361.5 dated May 4, 2004, 3 pages.
European Patent Office Search Report for European Application EP 04 25 0362.3 dated Mar. 22, 2004, 3 pages.
European Patent Office Search Report for European Application EP 04 25 0363.1 dated May 17, 2004, 3 pages.
European Patent Office Partial Search Report for European Application EP 04 25 0364.9 dated May 11, 2004, 4 pages.
European Patent Office Search Report for European Application EP 04 25 0365.6 dated May 7, 2004, 4 pages.
European Patent Office Search Report for European Application EP 04 25 0366.4 dated Mar. 18, 2004, 3 pages.
European Patent Office Search Report for European Application EP 04 25 0376.3 dated Mar. 23, 2004, 3 pages.
European Patent Office Search Report for European Application EP 04 25 0377.1 dated May 7, 2004, 3 pages.
European Patent Office Search Report for European Application EP 04 25 0380.5 dated May 10, 2004, 3 pages.
European Patent Office Search Report for European Application EP 04 25 0381.3 dated May 7, 2004, 4 pages.
European Patent Office Search Report for European Application EP 04 25 0382.1 dated May 7, 2004, 3 pages.
European Patent Office Search Report for European Application EP 04 25 0383.9 dated May 28, 2004, 4 pages.
European Patent Office Search Report for European Application EP 04 25 0384.7 dated May 7, 2004, 3 pages.
European Patent Office Search Report for European Application EP 04 25 0388.8 dated Jun. 1, 2004, 3 pages.
European Patent Office Search Report for European Application EP 04 25 0389.6 dated May 17, 2004, 3 pages.
European Patent Office Search Report for European Application EP 04 25 0390.4 dated Jun. 17, 2004, 4 pages.
PCT Invitation to Pay Additional Fees and Communication Relating to the Results of the Partial International Search Report of the European Patent Office International Searching Authority for International Application PCT/GB2004/000265 dated Jun. 17, 2004, 6 pages.
PCT International Search Report and Written Opinion of the European Patent Office International Searching Authority for International Application PCT/GB2004/000268 dated May 24, 2004, 10 pages.
PCT Invitation to Pay Additional Fees and Communication Relating to the Results of the Partial International Search Report of the European Patent Office International Searching Authority for International Application PCT/GB2004/000272 dated May 11, 2004, 5 pages.
PCT International Search Report and Written Opinion of the European Patent Office International Searching Authority for International Application PCT/GB2004/000272 dated Sep. 7, 2004, 17 pages.
PCT International Search Report and Written Opinion of the European Patent Office International Searching Authority for International Application PCT/GB2004/000273 dated May 12, 2004, 9 pages.
PCT Invitation to Pay Additional Fees and Communication Relating to the Results of the Partial International Search Report of the European Patent Office International Searching Authority for International Application PCT/GB2004/000276 dated May 24, 2004, 7 pages.
PCT International Search Report and Written Opinion of the European Patent Office International Searching Authority for International Application PCT/GB2004/000276 dated Sep. 7, 2004, 19 pages.

(56) References Cited

OTHER PUBLICATIONS

PCT International Search Report and Written Opinion of the European Patent Office International Searching Authority for International Application PCT/GB2004/000279 dated May 17, 2004, 9 pages.
PCT International Search Report and Written Opinion of the European Patent Office International Searching Authority for International Application PCT/GB2004/000282 dated Jun. 3, 2004, 9 pages.
PCT International Search Report and Written Opinion of the European Patent Office International Searching Authority for International Application PCT/GB2004/000287 dated Jun. 16, 2004, 10 pages.
The United Kingdom Patent Office Combined Search and Examination Report for Great Britain Application GB 0301679.7 dated Jun. 16, 2003, 4 pages.
The United Kingdom Patent Office Combined Search and Examination Report for Great Britain Application GB 0301680.5 dated Jun. 19, 2003, 5 pages.
The United Kingdom Patent Office Combined Search and Examination Report for Great Britain Application GB 0301681.3 dated Jun. 24, 2003, 4 pages.
The United Kingdom Patent Office Combined Search and Examination Report for Great Britain Application GB 0301696.1 dated May 27, 2003, 4 pages.
The United Kingdom Patent Office Combined Search and Examination Report for Great Britain Application GB 0301698.7 dated Jun. 16, 2003, 4 pages.
The United Kingdom Patent Office Combined Search and Examination Report for Great Britain Application GB 0301702.7 dated May 16, 2003, 4 pages.
The United Kingdom Patent Office Combined Search and Examination Report for Great Britain Application GB 0301708.4 dated Jun. 12, 2003, 4 pages.
The United Kingdom Patent Office Combined Search and Examination Report for Great Britain Application GB 0301709.2 dated May 8, 2003, 4 pages.
The United Kingdom Patent Office Combined Search and Examination Report for Great Britain Application GB 0301710.0 dated Jun. 12, 2003, 4 pages.
The United Kingdom Patent Office Combined Search and Examination Report for Great Britain Application GB 0301713.4 dated Jul. 16, 2003, 5 pages.
The United Kingdom Patent Office Combined Search and Examination Report for Great Britain Application GB 0301733.2 dated Jun. 27, 2003, 4 pages.
The United Kingdom Patent Office Combined Search and Examination Report for Great Britain Application GB 0301734.0 dated Jun. 27, 2003, 4 pages.
The United Kingdom Patent Office Combined Search and Examination Report for Great Britain Application GB 0301735.7 dated Jul. 4, 2003, 4 pages.
The United Kingdom Patent Office Combined Search and Examination Report for Great Britain Application GB 0301738.1 dated Jun. 9, 2003, 4 pages.
The United Kingdom Patent Office Combined Search and Examination Report for Great Britain Application GB 0301739.9 dated Jun. 17, 2003, 6 pages.
The United Kingdom Patent Office Combined Search and Examination Report for Great Britain Application GB 0301741.5 dated Jun. 16, 2003, 4 pages.
The United Kingdom Patent Office Combined Search and Examination Report for Great Britain Application GB 0301745.6 dated Jun. 17, 2003, 4 pages.
The United Kingdom Patent Office Combined Search and Examination Report for Great Britain Application GB 0301747.2 dated May 30, 2003, 5 pages.
Japanese Patent Office, Official Notice of Rejection mailed Jan. 11, 2013, from corresponding Japanese Patent App. No. 2010-509466, 4 pages.
Chinese Patent Office, Notification to Grant Patent Right for Invention dated Sep. 1, 2014, from corresponding Chinese Patent Application No. 200880016482.2, 2 pages.
English translation of claims 1-18 allowed in Notification to Grant Patent Right for Invention dated Sep. 1, 2014, from corresponding Chinese Patent Application No. 200880016482.2, 2 pages.
English translation of claims 1-16 rejected in Official Notice of Final Decision of Rejection mailed Jul. 29, 2014 for corresponding Japanese Patent Application No. 2010-509466, 2 pages.
Canadian Patent Office, Office Action dated Sep. 27, 2012, from corresponding Canadian Patent Application 2,684,130, 3 pages.
Chinese Patent Office, Office Action dated Apr. 21, 2011, from corresponding Chinese Patent Application 200880016482, 30 pages.
Chinese Patent Office, Office Action dated Apr. 12, 2012, from corresponding Chinese Patent Application 200880016482, 28 pages.
Chinese Patent Office, Office Action dated Jan. 28, 2013, from corresponding Chinese Patent Application 200880016482, 22 pages.
Chinese Patent Office, Office Action dated Feb. 8, 2014, from corresponding Chinese Patent Application 200880016482, 12 pages.
Japanese Patent Office, Office Action dated Jul. 29, 2014, from corresponding Japanese Patent Application 2010509466, 4 pages.
Russian Patent Office, Office Action dated Apr. 22, 2011, from corresponding Russian Application 2009147024, 5 pages.
Russian Patent Office, Office Action dated Aug. 12, 2011 from corresponding Russian Application 2009147024, 2 pages.
European Patent Office Communication of a Notice of Opposition dated Mar. 22, 2007, Opposition to European Patent EP 1 440 910 B1 by Opponent Mars Incorporated, 17 pages.
Harold McGee, "On Food and Cooking," The Science and Lore of the Kitchen, Harper Collins Publishers, London, 1991, p. 16.
Codex Standard for Evaporated Milks, Codex Stan A-3-1971, Rev. 1-1999, 3 pages.
European Patent Office Communication of a Notice of Opposition dated Mar. 22, 2007, Opposition to European Patent EP 1 440 910 B1 by Opponent Nestec S.A., 12 pages.
Food Composition and Nutrition Tables, Dairy Products, Medpharm Scientific Publishers, Stuttgart, 1994, 5 pages.
Notice of Opposition to a European Patent dated May 16, 2007, Opposition to European Patent EP 1 440 908 B1 by Opponent Friesland Brands B.V., 22 pages.
Notice of Opposition to a European Patent dated May 16, 2007, Opposition to European Patent EP 1 440 908 B1 by Opponent Nestec S.A., 9 pages.
European Patent Office Communication of a Notice of Opposition dated May 22, 2007, Opposition to European Patent EP 1 440 908 B1 by Opponent Sara Lee/DE N.V., 13 pages.
"More Solutions to Sticky Problems," A Guide to Getting More From Your Brookfield Viscometer, Brookfield Engineering Laboratories, Inc., Stoughton, Massachusetts, date unknown, 28 pages, May 1985.
European Patent Office Brief Communication dated Jul. 9, 2007, Opposition to European Patent EP 1 440 908 B1, Letter from Opponent Friesland Brands B.V. dated Jul. 3, 2007, 21 pages.
European Patent Office Communication of a Notice of Opposition dated Aug. 12, 2008, Opposition to European Patent EP 1 440 640 B1 by Opponent Nestec S.A., 17 pages.
European Patent Office Brief Communication dated Aug. 30, 2007, Opposition to European Patent EP 1 440 910 B1, Letter from Opponent Mars Incorporated dated Aug. 22, 2007, 3 pages.
Notice of Opposition to a European Patent dated Sep. 13, 2007, Opposition to European Patent EP 1 440 909 B1 by Opponent Friesland Brands B.V., 9 pages.
Notice of Opposition to a European Patent dated Sep. 13, 2007, Opposition to European Patent EP 1 440 909 B1 by Opponent Nestec S.A., 7 pages.

* cited by examiner

US 8,974,846 B2

BEVERAGE PREPARATION MACHINES AND METHODS FOR OPERATING BEVERAGE PREPARATION MACHINES

CROSS-REFERENCE TO RELATED APPLICATIONS

This application is a U.S. national phase application filed under 35 U.S.C. §371 of International Application PCT/US2008/063833, filed on May 16, 2008, designating the United States, which claims benefit to U.S. Application No. 60/940,118, filed on May 25, 2007, and Great Britain application GB 0709588.8, filed on May 18, 2007, all of which are hereby incorporated by reference herein.

FIELD

The present invention relates to beverage preparation machines and methods of operating beverage preparation machines. In particular, it relates to improvements in heating systems and the power management of such systems.

BACKGROUND

Beverage preparation machines such as coffee or tea brewing machines are well known. It is known to provide beverage preparation machines which dispense individual servings of beverage directly into a receptacle such as a cup. Such machines may derive the beverage from a bulk supply of beverage ingredients or from packages of beverage ingredients such as pods, pads or cartridges. An example of one type of such packages is shown in EP1440903. In the following specification such packages will be referenced by the general term cartridges. However, the invention is not limited to use with one particular type of pod, pad or cartridge. The beverages are formed from brewing, mixing, dissolving or suspending the beverage ingredients in water. For example, for coffee beverages, heated water is passed through the cartridges to form the extracted solution.

It is known to provide machines with a reservoir in which to store water. The reservoir may be manually refillable or, alternatively, it is known for machines to be plumbed into a mains supply of water which allows for semi-automatic or automatic refilling of the reservoir.

It is also known to provide beverage preparation machines comprising first and second brewers coupled together within a single housing or installation.

A problem with beverage preparation machines is that high demand on the machine—that is the need to dispense a number of beverages in quick succession—can lead to delays since the water in the reservoir must be heated to a particular temperature in order to allow for good quality beverages to be produced. One solution that has been suggested is to provide the machine with a more powerful heater. However, this solution can cause problems where the machine is to be used where there is a limited power supply available. In addition, limited power supply has been found to be a particular problem for beverage preparation machines comprising first and second brewers in a coupled arrangement.

It is therefore an object of the present invention to provide a beverage preparation machine and method which helps to overcome at least some of these problems.

SUMMARY

Accordingly, the present invention provides a method of operating a beverage preparation machine, the beverage preparation machine being of the type comprising a brewer comprising:

a reservoir containing water;
a delivery head for receiving in use a cartridge containing one or more beverage ingredients;
a pump for pumping water from said reservoir to said delivery head;
a primary heater for heating the water contained in said reservoir;
a secondary heater in between the reservoir and the delivery head;
a controller for controlling energisation of the primary heater and the secondary heater; and
wherein the controller operates to prevent energisation of the primary heater simultaneous with energisation of the secondary heater.

In this embodiment the machine comprises a single brewer with primary and secondary heaters. The controller ensures that the primary and secondary heaters are not energised at the same time thereby the total energy requirement of the machine can be reduced. In this way it is possible to use a more powerful primary heater and secondary heater than would be the case if both heaters were required to be energised simultaneously.

Preferably the beverage preparation machine is operated to dispense a beverage during a dispense cycle from the brewer, wherein the controller operates to energise the primary heater during a portion of the dispense cycle when the pump of said brewer is inactive.

Preferably the dispense cycle comprises one or more pauses where water is not pumped to said delivery head and wherein the controller operates to energise the primary heater during said one or more pauses.

For example, the one or more pauses may be for steeping the one or more beverage ingredients of a pod or cartridge.

During a dispense cycle the primary and secondary heaters may be energised alternately. Alternatively during a dispense cycle the secondary heater may be always energised and the primary heater may be always de-energised.

Preferably the water in the reservoir is heated to a temperature of between 70 and 95 degrees Celsius.

More preferably the water in the reservoir is heated to a temperature of approximately 85 degrees Celsius.

Preferably the temperature of the water pumped to the delivery head is boosted by use of the secondary heater by between 0 and 30 degrees Celsius.

Preferably the temperature of the water pumped to the delivery head is boosted by use of the secondary heater such that the temperature of the water on reaching the delivery head is between 85 and 94 degrees Celsius.

The method may further comprise passing steam through the delivery head after dispensation of a beverage from the brewer.

The steam may be generated by the secondary heater.

The present invention also provides a beverage preparation machine comprising a brewer comprising:

a reservoir for water;
a delivery head for receiving in use a cartridge containing one or more beverage ingredients;
a pump for pumping water from said reservoir to said delivery head;
a primary heater for heating water contained in said reservoir;
a secondary heater in between the reservoir and the delivery head;
a controller for controlling energisation of the primary heater and the secondary heater; and wherein the controller is operable to prevent energisation of the primary heater simultaneous with energisation of the secondary heater.

Preferably the controller is operable to prevent energisation of the primary heater during pumping of water by the pump.

Preferably the primary heater is located in the reservoir.

Preferably the primary heater comprises an electrical power heating source.

Preferably the secondary heater is located in the flow path extending from the reservoir to the delivery head.

Preferably the secondary heater comprises an instantaneous heater.

In another aspect, the present invention further provides a method of operating a beverage preparation machine, the beverage preparation machine being of the type comprising a first brewer and a second brewer, each of the first and second brewers comprising:

a reservoir containing water;

a delivery head for receiving in use a cartridge containing one or more beverage ingredients;

a primary heater for heating the water contained in said reservoir;

wherein the beverage preparation machine further comprises:

at least one pump for pumping water from said reservoirs to said delivery heads;

a controller for controlling energisation of the primary heater of each of the first brewer and the second brewer, the method of operation comprising operating the controller to prevent simultaneous energisation of the primary heaters of both the first brewer and the second brewer.

By controlling energisation of the primary heaters to ensure that they are not both energised at the same time the total energy requirement of the machine can be reduced. In this way it is possible to use a more powerful primary heater in each brewer.

Preferably the method further comprises operating the controller to prevent energisation of the primary heater of either of the first brewer or the second brewer during pumping of water by the at least one pump.

Preferably the method further comprises operating the controller to prevent energisation of the primary heater of either of the first brewer or the second brewer during delivery of a beverage into a receptacle from either the first brewer or the second brewer.

In this way the brewers do not use power for pumping water, or delivering beverages at the same time as either of the primary heaters are energised. Again, this allows for a more powerful primary heater to be utilised in each brewer without the total power requirement of the machine exceeding the available power supply.

Preferably the method further comprises energising the primary heater of one of the first brewer and the second brewer on a first demand from the controller and operating the controller to prevent energisation of the primary heater of the other of the first brewer and the second brewer until after the energised primary heater has been de-energised.

In this way the controller operates the primary heaters of the two brewers on a first come-first served basis. In other words once the primary heater of one brewer is switched on it remains on until the water in the reservoir of that heater reaches the required temperature or until some other action—such as a demand to dispense a beverage from the other brewer—interrupts heating. This minimises the time delay until at least one of the brewers is available and ready to dispense a beverage.

Preferably the method further comprises heating the water in the reservoir of the first and or second brewer to a temperature of between 70 and 95 degrees Celsius.

More preferably the water in the reservoir of the first and or second brewer is heated to a temperature of approximately 85 degrees Celsius.

Preferably each of the first and second brewers comprises a pump. Using a separate pump in each brewer rather than a single pump for both brewers reduces the complexity of the hydraulic circuit of the brewers and removes the need for complicated valving to divert flow between the brewers.

Preferably each of the first brewer and the second brewer further comprises a secondary heater in the flow path between the reservoir and an outlet of the delivery head and wherein the controller is operable to prevent energisation of either of the primary heaters simultaneous with energisation of either of the secondary heaters.

The use of secondary heaters is advantageous in order to provide accurate control of the water temperature when it reaches the beverage ingredients and also to speed up the speed of response of the machine when required to dispense successive beverages at different temperatures. By using the controller to prevent energisation of either of the secondary heaters with either of the primary heaters the total power draw of the machine can be limited within the available power supply whilst utilising a high power primary heater in each brewer.

Preferably the controller is operable to allow energisation of the secondary heaters of both the first brewer and the second brewer simultaneously.

Advantageously, the ability to operate both secondary heaters at the same time allows the machine to dispense beverages from both brewers simultaneously.

Preferably the beverage preparation machine is operated to dispense a beverage during a dispense cycle from the first or second brewer, wherein the controller operates to energise the primary heater of said first or second brewer during a portion of the dispense cycle when the at least one pump is inactive.

Preferably the beverage preparation machine is operated to dispense one or simultaneously two beverages during a dispense cycle from the first and second brewer, wherein the controller operates to energise the primary heater of the first or second brewer during a portion of the dispense cycle when the at least one pump is inactive.

In this way the machine can flexibly dispense one beverage from one or both brewers or two beverages using both brewers in sequential order or simultaneously. In addition, the primary heater of one or other of the brewers can be switched on whenever the secondary heaters of the machine are not being used and or when the pumps are inactive.

The dispense cycle may comprise one or more pauses where water is not pumped to said delivery head and wherein the controller operates to energise the primary heater of said first or second brewer during said one or more pauses.

For example, the one or more pauses may be for steeping the one or more beverage ingredients of a pod or cartridge or during purging of a pod or cartridge at the end of the dispense cycle.

Thus, advantageously even during relatively short periods when the pumps and secondary heaters are inactive one of the primary heaters may be switched on to help to ready the water in the reservoirs to be able to quickly dispense a subsequent beverage. For example, the pauses may be of a duration of a few seconds, such as a 10 second pause for steeping a ground coffee beverage ingredient.

Preferably the method further comprises boosting the temperature of the water pumped to the delivery head of the first and or second brewer by use of the secondary heater by between 0 and 30 degrees Celsius.

For example, the temperature of the water pumped to the delivery head of the first and or second brewer may be boosted by use of the secondary heater such that the temperature of the water on reaching the delivery head is between 85 and 94 degrees Celsius.

Dependant on the actual water temperature in the reservoir and the target dispense temperature of the beverage the temperature of the water may or may not need boosting by the secondary heater. If no temperature boost is required then the water simply passes the heater with the secondary heater switched off. If a temperature boost is required the secondary heater is switched on.

The method may further comprise passing steam through the delivery head of the first and or second brewer after dispensation of a beverage from the first and or second brewer.

Preferably the steam is generated by the secondary heater of the first and or second brewer.

The steam can be used both to clean the delivery head after some or each dispense cycle and can also be used to drive out most or all liquid remaining in the single serve package in the delivery head. This reduces the amount of soiling of the delivery head on ejection of the package and also helps to ensure consistency in the volume of liquid dispensed during each dispense cycle.

The method may comprise operating the first brewer and the second brewer simultaneously to dispense a single beverage, the single beverage comprising a first portion dispensed from the delivery head of the first brewer and a second portion dispensed from the delivery head of the second brewer.

Alternatively the method can comprise operating the first brewer and the second brewer simultaneously to dispense a first beverage and a second beverage, the first beverage being dispensed from the delivery head of the first brewer and the second beverage being dispensed from the delivery head of the second brewer.

The total power drawn by the beverage preparation machine in use may be less than 3120 Watts. This is particularly advantageous for machines to be used in European locations in order to match the available power supply.

The total power drawn by the beverage preparation machine in use may be less than 1800 Watts. This is particularly advantageous for machines to be used in the United States in order to match the available power supply.

The present invention also provides a beverage preparation machine comprising a first brewer and a second brewer, each of the first and second brewers comprising:

a reservoir for water;

a delivery head for receiving in use a cartridge containing one or more beverage ingredients;

a primary heater for heating water contained in said reservoir;

wherein the beverage preparation machine further comprises:

at least one pump for pumping water from said reservoirs to said delivery heads;

a controller for controlling energisation of the primary heater of each of the first brewer and the second brewer, wherein the controller is operable to prevent simultaneous energisation of the primary heaters of both the first brewer and the second brewer.

Preferably the controller is operable to prevent energisation of the primary heater of either of the first brewer or the second brewer during pumping of water by the pump of either the first brewer or the second brewer.

Preferably the controller is operable to prevent energisation of the primary heater of either of the first brewer or the second brewer during delivery of a beverage into a receptacle from either the first brewer or the second brewer.

Preferably the primary heater of the first brewer is located in the reservoir of the first brewer and the primary heater of the second brewer is located in the reservoir of the second brewer.

Each primary heater may have a power rating of less than or equal to 3120 Watts.

Each primary heater may have a power rating of less than or equal to 1800 Watts.

Each primary heater preferably comprises an electrical power heating source.

The controller may comprise a first controller device for controlling operation of the first brewer and a second controller device for controlling operation of the second brewer.

Preferably the first controller device is located in the first brewer and the second controller device is located in the second brewer.

The first controller device and the second controller device are preferably operatively interconnected.

Preferably each of the first brewer and the second brewer further comprises a secondary heater in between the reservoir and an outlet of the delivery head and wherein the controller is operable to prevent energisation of either of the primary heaters simultaneous with energisation of either of the secondary heaters.

Preferably the controller is operable to allow energisation of the secondary heaters of both the first brewer and the second brewer simultaneously.

Preferably each secondary heater is located in the flow path extending from the reservoir to the delivery head.

Each secondary heater may have a power rating of less than or equal to 1500 Watts.

Each secondary heater may have a power rating of less than or equal to 900 Watts.

Preferably each secondary heater comprises an instantaneous heater. For example the secondary heaters may be in-line electrical flash heaters.

Advantageously, the machine may comprise only a single power inlet connection. This allows the machine to be installed in a wide variety of locations without the need to take up a number of power sockets or to be supplied with a specialised form of power supply.

The present invention also provides a beverage preparation system comprising a beverage preparation machine as described above and one or more cartridges containing one or more beverage ingredients.

The present invention further provides a beverage preparation machine comprising:

a reservoir for water;

a delivery head for receiving in use a cartridge containing one or more beverage ingredients;

a pump for pumping water from said reservoir to said delivery head;

a primary heater for heating water contained in said reservoir;

a temperature sensor for sensing the temperature of water in the reservoir;

an inlet valve communicating with the reservoir and connectable to an external source of water and operable to control inflow of water into the reservoir;

a controller for controlling operation of the inlet valve, said controller being operatively connected to the temperature sensor to receive temperature signals indicative of the temperature of water in the reservoir and operatively connected to the inlet valve to control opening and closing of the inlet valve;

wherein the controller is operable to open the inlet valve to allow inflow of water into the reservoir in response to temperature signals from the temperature sensor;

wherein the controller is operable to open the inlet valve to allow inflow of water when the temperature of the water in the reservoir is within a fill differential of a target water temperature;

further, wherein the controller is operable to allow actuation of the pump in order to dispense a beverage only when the temperature of the water within the reservoir is within a vend differential of the target water temperature.

In this way, filling of the reservoir is controlled in order to limit the impact on the machine's ability to be ready to dispense beverages on demand.

Preferably the target temperature is between 70 and 95 degrees Celsius.

Preferably the target temperature is approximately 85 degrees Celsius.

Advantageously the fill differential is smaller than the vend differential. Thus, filling of the reservoir is only permitted when there is some capacity for water to be added without dropping the temperature of the reservoir below the point where the machine is able to dispense beverages.

Preferably the fill differential is approximately 5 degrees Celsius.

Preferably the vend differential is approximately 10 degrees Celsius.

Preferably the controller is operable to execute a time delay between closing of the inlet valve and re-opening of the inlet valve. This allows for slopping of the water in the reservoir to subside to ensure accurate readings by any volume sensors installed in the reservoir and also to allow for the cooling effect of the added water to be sensed by the temperature sensor of the reservoir.

The beverage preparation machine may comprise a first brewer and a second brewer, each of the first and second brewers comprising a beverage preparation machine as described above.

The present invention also provide a method of operating a beverage preparation machine of the type comprising:

a reservoir for water;

a delivery head for receiving in use a cartridge containing one or more beverage ingredients;

a pump for pumping water from said reservoir to said delivery head;

a primary heater for heating water contained in said reservoir;

a temperature sensor for sensing the temperature of water in the reservoir;

an inlet valve communicating with the reservoir and connectable to an external source of water and operable to control inflow of water into the reservoir;

a controller for controlling operation of the inlet valve, said controller being operatively connected to the temperature sensor to receive temperature signals indicative of the temperature of water in the reservoir and operatively connected to the inlet valve to control opening and closing of the inlet valve;

the method comprising the steps of operating the controller to open the inlet valve to allow inflow of water into the reservoir in response to temperature signals from the temperature sensor;

operating the controller to open the inlet valve to allow inflow of water when the temperature of the water in the reservoir is within a fill differential of a target water temperature;

further, operating the controller to allow actuation of the pump in order to dispense a beverage only when the temperature of the water within the reservoir is within a vend differential of the target water temperature.

Preferably the controller is operated to execute a time delay between closing of the inlet valve and re-opening of the inlet valve.

BRIEF DESCRIPTION OF THE DRAWINGS

Embodiments of the present invention will now be described, by way of example only, with reference to the accompanying drawings in which:

FIG. 6 is a diagram illustrating operation of the beverage preparation machine of FIG. 1 when first switched on.

DETAILED DESCRIPTION

Figure 1:
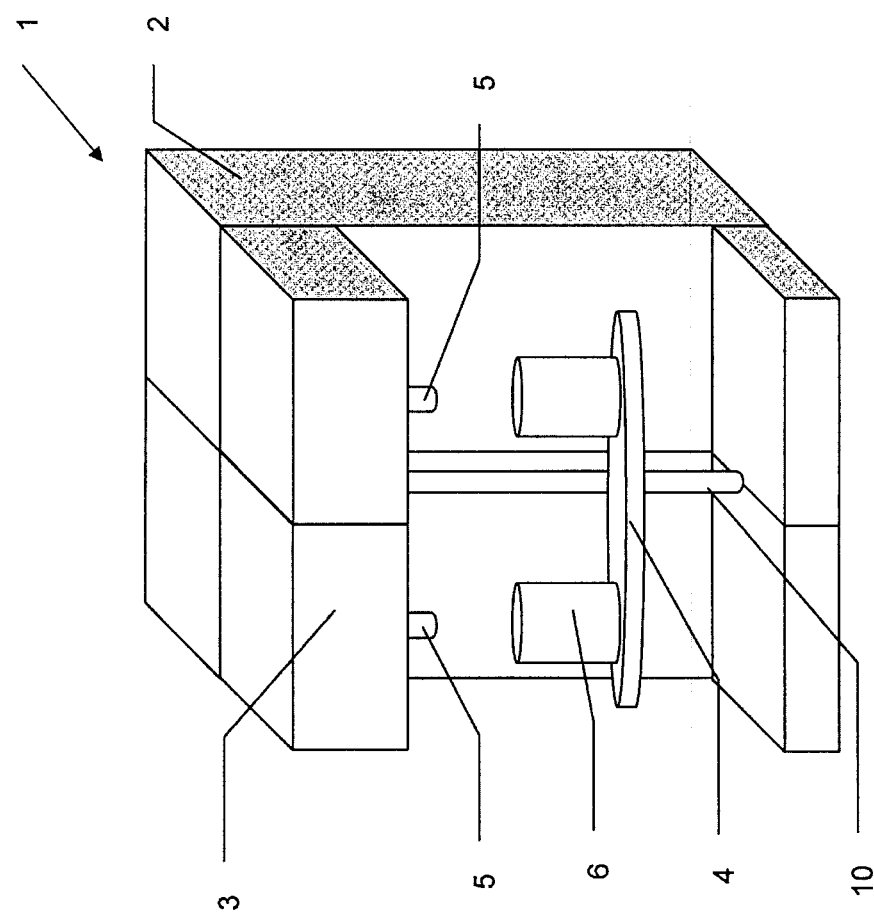
FIG. 1 is perspective view of a first embodiment of beverage preparation machine according to the present invention which includes first and second brewers.
Figure 2:
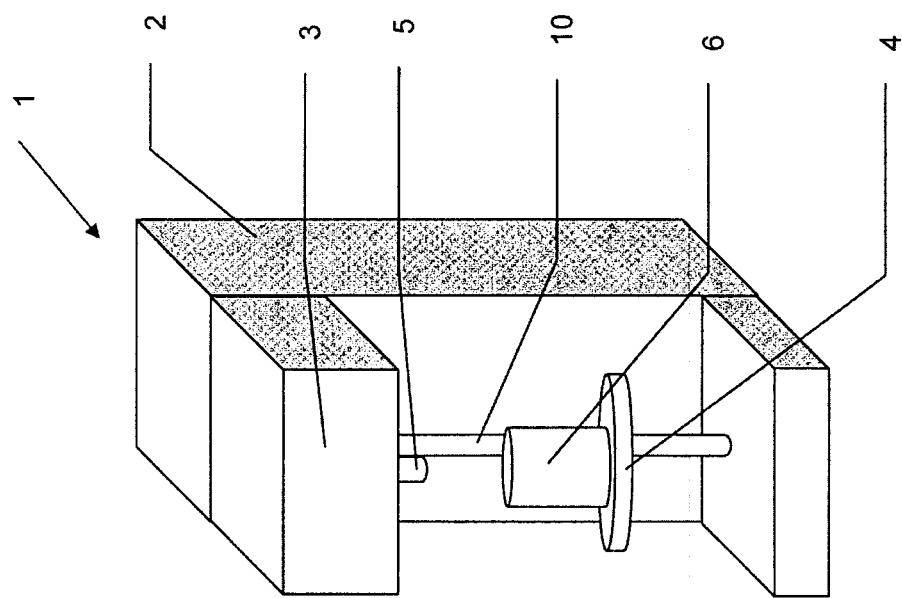
FIG. 2 is a perspective view of a second embodiment of beverage preparation machine according to the present invention which includes a single brewer.

The beverage preparation machines 1 of FIGS. 1 and 2 each comprise a housing 2 containing the internal mechanisms of the machine such as a water reservoir, a pump and a heating means.

The machine 1 of FIG. 2 comprises a single brewer. The machine 1 of FIG. 1 comprises a first brewer and a second brewer coupled together.

Each brewer of the machines 1 comprises a delivery head 3 provided towards an upper part of the housing 2 in which, in use, is received a cartridge containing one or more beverage ingredients. Beverage is dispensed from the brewer through an outlet spout 5 by pumping water from the reservoir of the brewer through the cartridge to form the beverage which is then directed through the outlet spout 5 into a cup 6. As can be seen in FIG. 1, two outlet spouts 5 are provided for a machine with two brewers.

Figure 3:
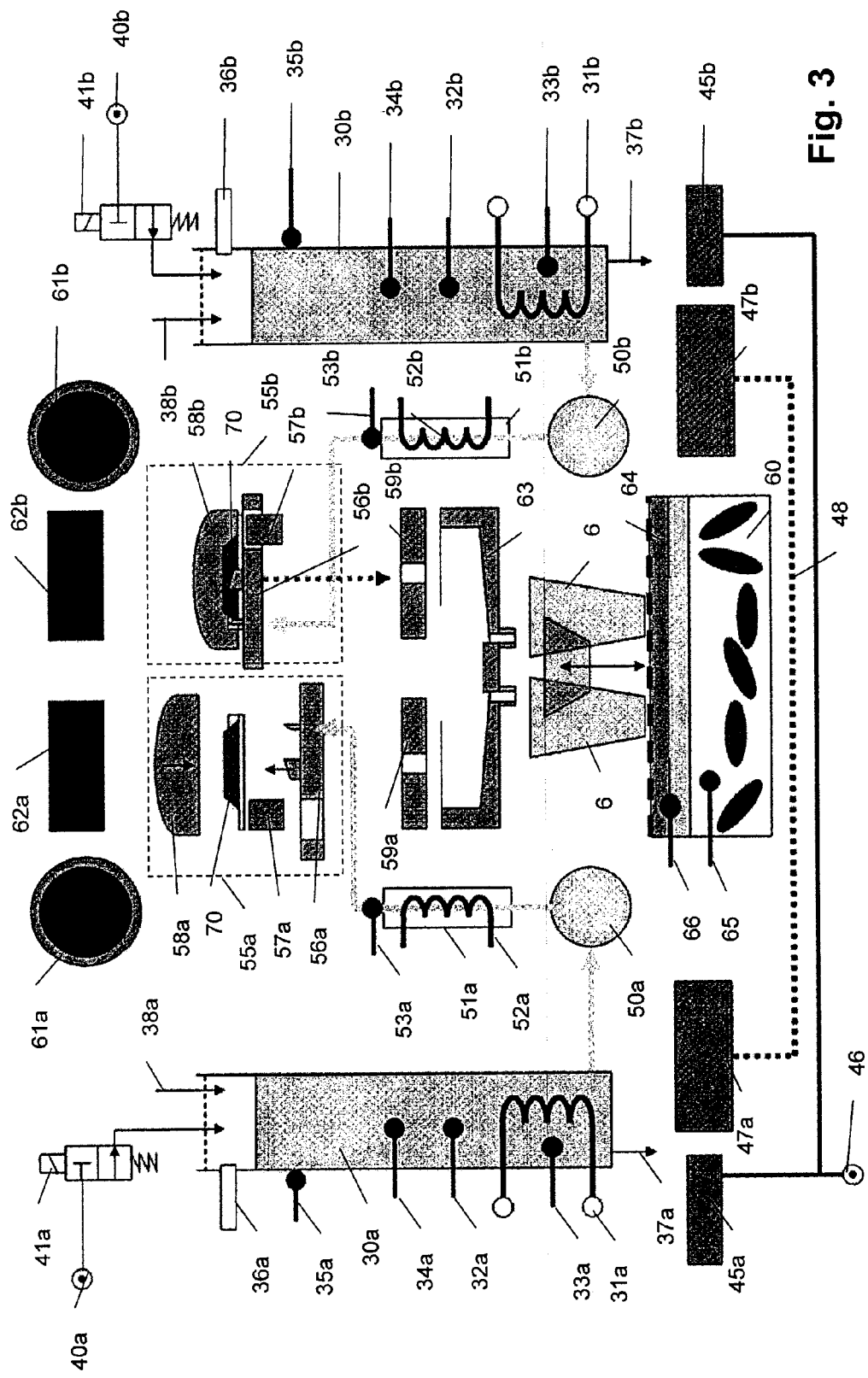
FIG. 3 is a schematic diagram of the beverage preparation machine of FIG. 1.

As shown in FIG. 3, the first and second brewers of the beverage machine of FIG. 1 are of the same configuration internally and functionally. The components of the first brewer are shown in FIG. 3 with the suffix 'a' and the components of the second brewer are shown with the suffix 'b'. Each brewer comprises a reservoir 30, a power supply unit (PSU) 45, a controller 47, a pump 50, a secondary heater 51, a delivery head (shown in FIG. 3 by the collective numeral 55) and a user interface 61, 62.

The machine 1 further comprises a common flow diverter 63 which channels the output from the delivery heads 55 into one or more receptacles 6 positioned on a drip tray 64 or cup stand assembly 4. The drip tray 64 may be provided with a sensor 66 connected to one or both of the controllers 47 to indicate when the drip tray 64 is full. There is also provided a waste bin 60 for ejected cartridges. The waste bin 60 is provided with a sensor 65 connected to one or both of the controllers 47 to detect when the waste bin 60 is full. The cup stand assembly may comprise a cup stand 6 mounted on a shaft 10.

Each reservoir 30 comprises a primary heater 31 in the form of an immersion heater element, a water temperature sensor 32, an overheat sensor 33, water level sensors 34, a boil sensor 35, an overflow outlet 36 and a drain point 36. In addition the reservoir 30 is provided with a filling point where a manual fill 38 may be carried out—for example by accessing the reservoir through a removable lid, or an automatic fill may be carried out using an inlet valve 41 plumbed into a mains supply 40 of water.

Each PSU 45 provides electrical power to its respective brewer. The PSUs 45 are connected to an external mains supply 46. A single external connection to the mains power supply 46 is utilised. For example a single power flex terminating in a two or three pin plug is provided.

Each controller 47 comprises a printed circuit board (PCB) having mounted thereon a processor and memory as well as an input/output interface for transmitting and receiving signals from the primary heater 31, temperature sensor 32, overheat sensor 33, water level sensors 34, boil sensor 35, inlet valve 41, PSU 45, pump 50, secondary heater 51, delivery head 55 and user interface 61, 62 of its respective brewer. In addition, the controllers 47 of the two brewers transmit and receive signals from each other using interconnect 48 in order to co-ordinate operation of the two brewers as described below. The interconnect 48 may be a collection of wire connects or a dedicated data bus with onboard controller.

The memory stores operational code which is used to control the operational behaviour of the machine under various operational scenarios as will be described below. The memory may be a read-only memory or a writable memory such as an EPROM.

Each pump 50 has an input connected to its respective reservoir 30 and an output connected to its respective secondary heater 51. The pumps 50 may be a peristaltic type of pump wherein a known volume of water is throughput on each cycle or revolution of the pumping member. Alternatively, a pulse counter encoder may be utilised connected to the controller for determining volume throughput. The flow rate produced by the pumps 50 may be varied under the control of the controller 47 between dispense cycles and within an individual dispense cycle. Typically flow rates of between 0 and 13 mls$^{-1}$ are utilised. Advantageously a very slow flow rate is used at the start of the dispense cycle to maximise heat transfer from the secondary heaters 51.

Preferably, an electromechanical check valve is located between the pump 50 and the secondary heater 51. In addition a 2.5 bar overpressure device is fitted to the flow line.

Each secondary heater 51 comprises an instantaneous flash heater having a through-flow tube in which water to be heated passes and an electrical heating element 52 thermally connected to an exterior of the tube. A temperature sensor 53 is located at the exit of the secondary heater 51 to monitor the temperature of the water exiting the secondary heater. This measurement is fed to the controller 47.

The output from the secondary heater 51 is delivered to the delivery head 55.

The delivery head 55 comprises a piercing element 56 and a clamping element 58 which can receive in use a cartridge 70 which is to be dispensed. A barcode reader 57 is provided for reading an identifying barcode located on the cartridge 70. The delivery head 55 can be moved in between an open configuration in which the cartridge 70 can be inserted into the delivery head 55 and a closed configuration in which the cartridge 70 is clamped by the clamping member 58 and an inlet and outlet are formed by the piercing element 56.

An ejection mechanism 59 may be provided for ejecting the cartridges 70 from the delivery head 55 after dispensation. However, for the purposes of the present invention the ejection mechanism and the detailed operation of the delivery head 55 will not be described in detail.

Each user interface comprises a start/stop button 61 and a LCD display panel 62 for displaying information to a user.

Figure 4:
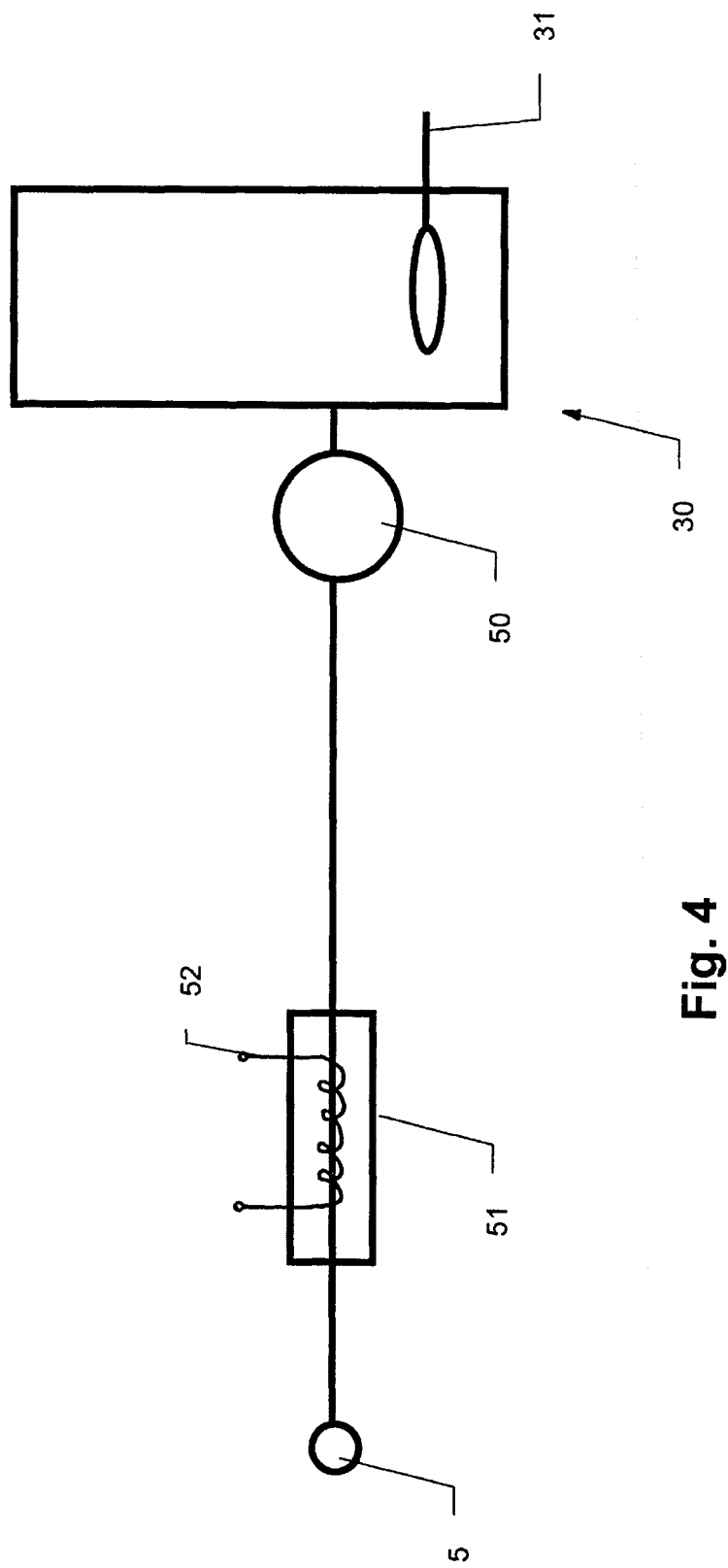
FIG. 4 is a schematic diagram of a water flow path within the beverage preparation machines of FIGS. 1 and 2.

In use, assuming that the water in one of the reservoirs 30 is at the required temperature the LCD display 62 for that brewer will indicate that a cartridge should be inserted into the delivery head 55. The cartridge 70 is then inserted by a user and the delivery head 55 closed to pierce the cartridge 55. The start/stop button 61 is then pressed to commence the dispense cycle. During dispense water follows a flow path as shown schematically in FIG. 4. A portion of the water in the reservoir 30 that has been heated to a holding temperature by the primary heater 31 is pumped by the pump 50 through the secondary heater 51 to the delivery head 55. On passing through the secondary heater 51 the temperature of the water is raised, if required, by energisation of the secondary heater element 52. On reaching the delivery head 55 the water is directed through the cartridge 70 to form the beverage. The beverage exits the outlet of the cartridge and is directed via the flow diverter 63 out of one of the outlets 5 of the machine 1 into a receptacle 6.

The holding temperature of the reservoir is between 70 and 95 degrees Celsius and preferably is 85 degrees Celsius.

The temperature of the water on exiting the secondary heater 53 is set by the controller 47 and a positive feedback control is utilised using the temperature sensor 53 with the controller 47 adjusting the power of the heating element 52 as necessary to achieve the desired temperature for the water at the point the water reaches the delivery head. The temperature of the water reaching the delivery head is desired to be between 85 and 94 degrees Celsius depending on the type of beverage being dispensed. Thus, the desired temperature of the water directly exiting the secondary heater will be greater than this to allow for heat losses during transport of the water from the secondary heater to the delivery head. In practice the required temperature levels at the exit of the secondary heater for the water would be determined by experiment but may, for example, be in the range of 90 to 103 degrees Celsius.

According to the present invention, the control of the machine as determined by operation of the controllers 47 is programmed to limit the maximum power requirement of the machine 1.

Firstly, each controller 47 operates to prevent simultaneous energisation of the primary heater 31 and secondary heater 51 of its own brewer. Secondly, the controllers 47 of both brewers communicate using the interconnect 48 to prevent energisation of the primary heater 31 of one brewer at the same time as energisation of the primary heater 31 or secondary heater 51 of the other brewer. In other words, the two primary heaters 31 cannot be energised simultaneously and neither can either primary heater 31 be energised simultaneously with either secondary heater 51. An advantage of the present machine is that both secondary heaters 51 may be energised simultaneously. This allows both brewers to dispense at the same time.

Figure 5:
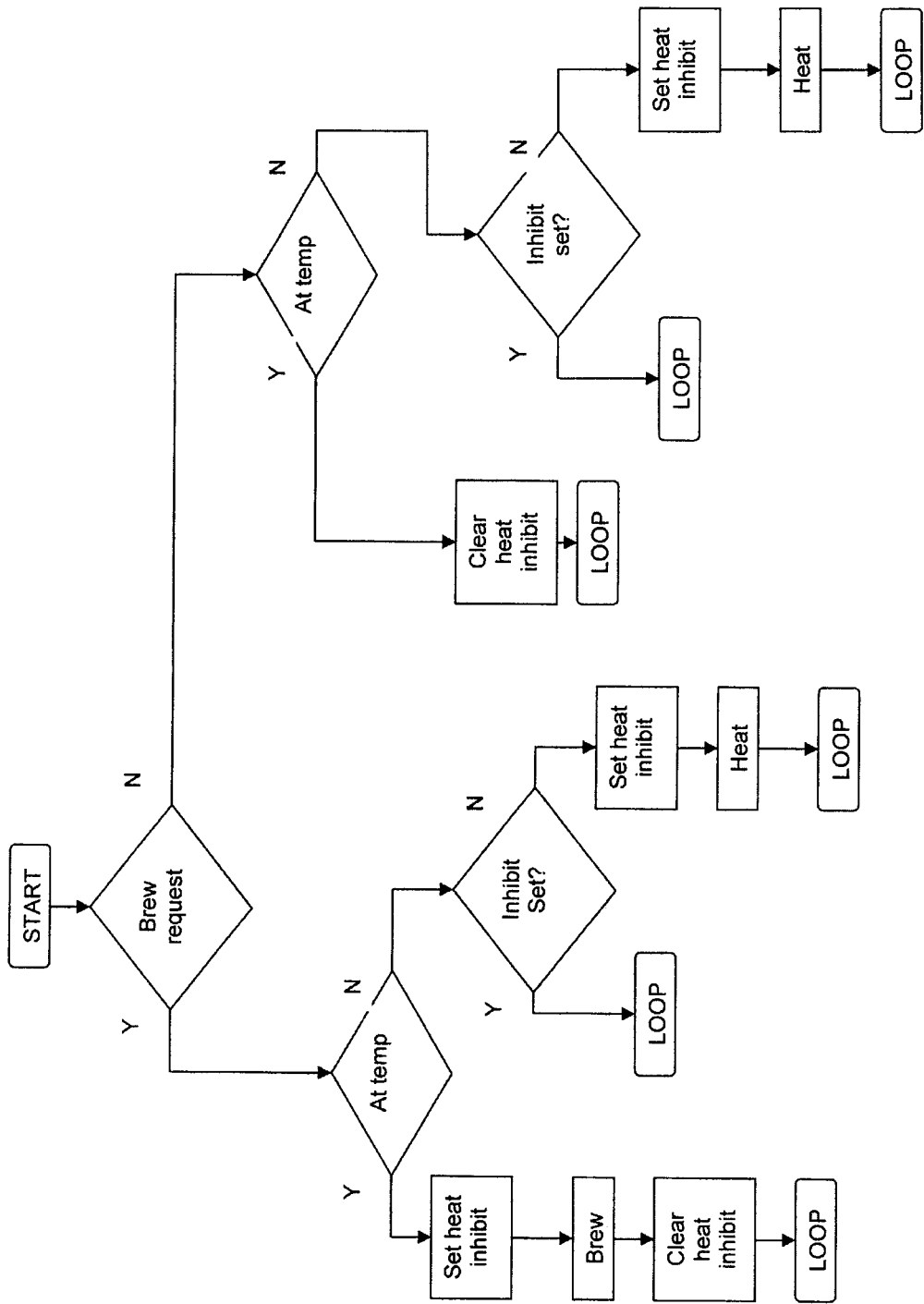
FIG. 5 is a flow diagram illustrating aspects of the operation of a controller of the beverage preparation machine of FIG. 1.

The control logic applied by both controllers 47 is shown schematically in the flow chart of FIG. 5. The 'start' box represents the start point of the control loop and the machine would initially be in this position on first switching on. The primary heaters 31 of the brewers operate on a first come-first served basis such that the controller 47 that first requests to switch on its primary heater 31 will be successful and this primary heater 31 will remain energised until either the water in the reservoir 30 reaches the holding temperature or a dispense cycle is initiated.

Both controllers 47 can set or release a 'heat inhibit' condition which prevents energisation of the primary heater 31 of the other brewer.

Figure 6:
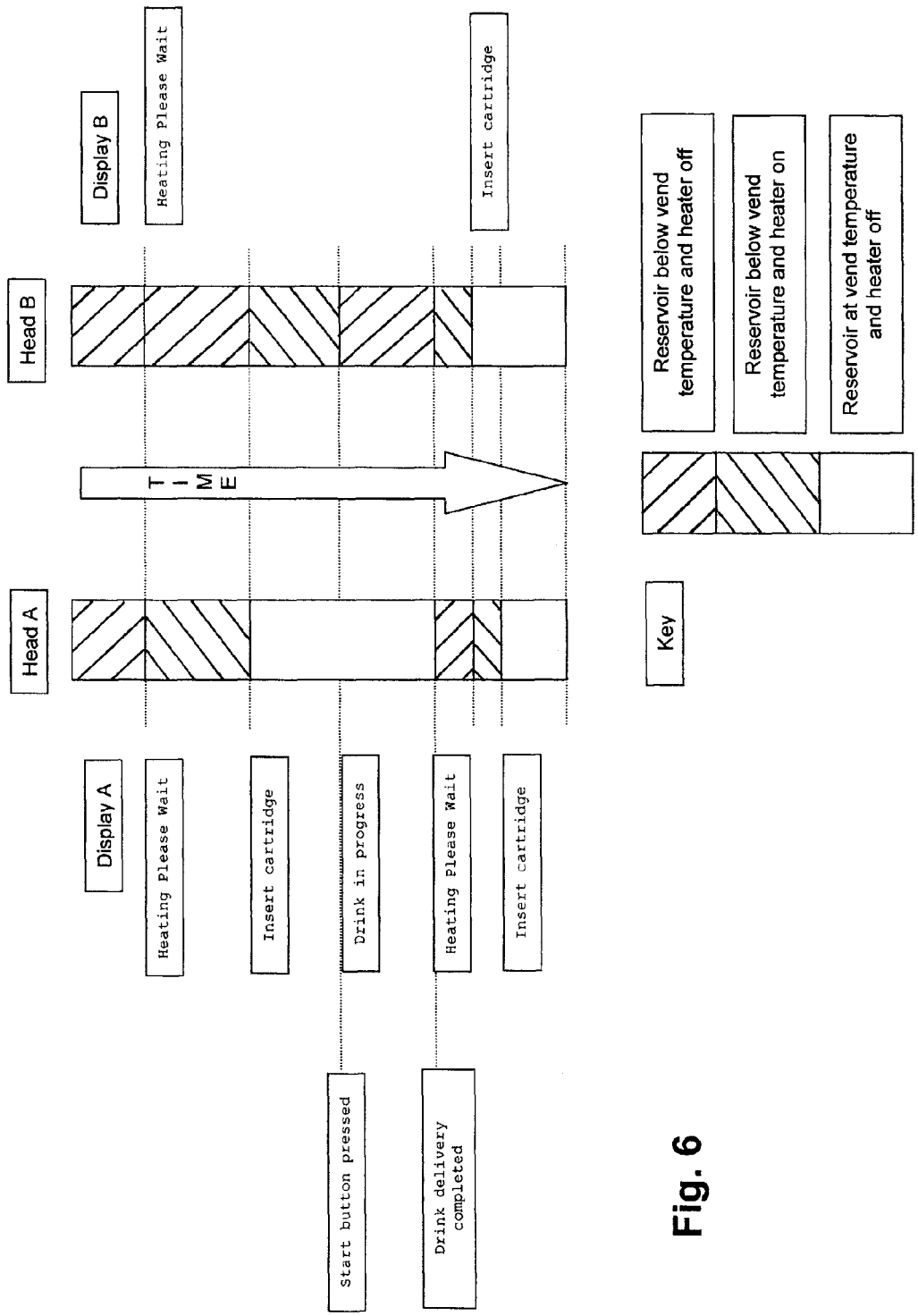

An example of the control logic in operation is shown in FIG. 6 which illustrates the initial operation of the machine on switching on. At first the reservoirs 30 of the first and second brewers are below the holding temperature therefore on switching on both LCD displays show a 'Heating Please Wait' message. On switching on the first brewer, in this example, is first to request energisation of its primary heater 31a and thus its primary heater 31a switches on. Because of this the primary heater 31b of the second brewer remains off. Once the temperature of the reservoir 30a is up to the holding temperature a 'Please Insert Cartridge' message is displayed on the display 62a of the first brewer. At this point the controller 47a of the first brewer de-energises its primary heater 31a and clears the 'heat inhibit' condition allowing the controller 47b of the second brewer to energise its primary heater 31b.

FIG. 6 illustrates that if during heating of the water in reservoir 30b a user commences a dispense cycle using the first brewer by pressing the start/stop button 61a this takes precedence and the primary heater 31b of the second brewer is de-energised to allow the secondary heater 51a of the first brewer to be switched on.

FIG. 6 further illustrates that if dispensing the beverage from the first brewer causes its reservoir 30a to fall below the holding temperature (in reality this would require dispensation of a number of beverages) then the primary heater 31a will want to switch on at the end of the dispense cycle. However, in this example, using the first come-first served principle, the controller 47b of the second brewer is first to request energisation of its primary heater 31b. Thus the reservoir 30b of the second brewer heats up to the holding temperature first at which point the primary heater 31b switches off allowing the primary heater 31a of the first brewer to switch back on.

An advantage of this method of control is that one of the brewers will heat up quickly on initial start up to allow quick dispensation to take place.

The intercommunication between the controllers 47 allows for energisation of the primary heater 31 of one of the brewers even during relatively short pauses in use of the pumps or secondary heaters 51 of the brewers. For example, the primary heater 31 of one of the brewers may be energised during a steeping pause in a dispense cycle.

Optionally, the brewers may use a steam purge for cleaning the delivery heads 55 and also to help drive out liquid or beverage from the cartridges 70. The steam is generated by the secondary heater 51. The steam may be producing from water fed to the secondary heater 51 specifically for this purpose but is preferably generated from residual water remaining in the secondary heater 51 and associated pipework at the end of the beverage dispensation phase of the delivery cycle. The steam may be generated by specific energisation the secondary heater 51 for a period or relying on the residual heat energy contained in the secondary heater 51 and associated pipework from heating the liquid water.

Aspects of the present invention also apply to a beverage preparation machine comprising a single brewer as shown in FIG. 2. The operation, construction and temperature control of the single brewer is as explained above with regard to the beverage preparation machine comprising first and second brewers mutatis mutandis. In particular operation of the single brewer is controlled by controller 47. In this case the controller 47 acts to ensure that the primary heater 31 and secondary heater 51 are not energised simultaneously in the same manner as described above.

As described in the above embodiments the temperature of the water exiting the secondary heater 51 can be controlled by positive feedback control using the controller 47 and the temperature sensor 53. It has been found that positive feedback control of the water temperature is somewhat ineffective for the first few seconds of the water flow. In other words, it requires a few seconds for the feedback loop to be established before accurate temperature control is obtained. In order to provide more effective temperature control, especially for the initial period of water flow, feed-forward temperature control is implemented. The controller 47 is pre-programmed with a number of operational scenarios and adjusts the operation of the secondary heater 51 accordingly. The controller 47 selects the operational behaviour based on the time since the last dispense cycle and the temperature of the secondary heater 51.

For example, where a relatively long period has elapsed since the last dispense cycle (e.g. over 10 minutes) a 'cold start' program is initiated wherein a small volume (around 10 ml) of water is pumped through the pipework into the secondary heater 51 and then held there whilst the secondary heater 51 is energised to heat the water to the required pre-wet temperature before passing the water to the brew head. The length of this 'stabilisation time' will be longer for a 'cold start' than for an 'intermediate start' where a beverage has been dispensed within, say, the last five minutes. For a 'hot start' where a beverage is dispensed immediately or very shortly after a preceding beverage the stabilisation time will be shorter still—or indeed no stabilisation time may be required at all.

Feed-forward control of the secondary heater 51 applies equally to all of the embodiments described above.

In the above embodiments, a beverage dispense cycle may be operated using energisation of only the secondary heater (s) 51. In other words, the primary heater(s) may be off during the entire time that a beverage is being dispensed. Thereafter the primary heater(s) may be energised if required to maintain or raise the temperature in the reservoir(s) 30.

The controllers 47 of the machines 1 of FIGS. 1 and 2 can also be used to control automatic refilling of each reservoir 30. Operation of the inlet valve 41 is under the control of the controller 47. The controller 47 operates to limit the temperature drop of the reservoir 30 caused by injecting cold water into the heated water already in the reservoir 30. This is achieved by monitoring the actual temperature of the water using the temperatures sensor 32 and only allowing the inlet valve 41 to be opened when the actual temperature is within a fill differential of the target holding temperature. For example, when the target holding temperature is 85 degrees Celsius a fill differential of 5 degrees may be used meaning that the inlet valve 41 cannot be opened to admit water to the reservoir until the actual temperature is at least 80 degrees Celsius. In addition, the controller 47 utilises a vend differential parameter to control when the water in the reservoir is sufficiently close to the target holding temperature to allow a dispense cycle to take place. For example, the vend differential may be set at 10 degrees meaning that dispensation can take place as long as the actual water temperature is at least 75 degrees Celsius (in this case the secondary heater 51 is used to make up the initial temperature deficit to ensure the water is at the target delivery temperature when it reaches the delivery head 55).

As a result a reservoir 30 that is sitting at the target temperature may be refilled when water is pumped out of the reservoir until the temperature in the reservoir falls by 5 degrees. Thus top-up filling of the reservoir in these circumstances does not prevent the immediate use of further water if demanded. Under very heavy usage conditions (or on the first filling of the reservoir after plumbing in or emptying for servicing) the water level in the reservoir 30 may reach the low level sensor 34 at which point the controller 47 will open the inlet valve 41 to allow refilling and dispensation of beverages will not be possible until the reservoir reaches at least 75 degrees Celsius.

The invention claimed is:

1. A method of operating a beverage preparation machine, the beverage preparation machine comprising a brewer comprising:
   a reservoir containing water;
   a delivery head for receiving in use a cartridge containing one or more beverage ingredients;
   a pump for pumping water from said reservoir to said delivery head;
   a primary heater for heating the water contained in said reservoir;
   a secondary heater in between the reservoir and the delivery head;
   a controller for controlling energisation of the primary heater and the secondary heater; and
   wherein the controller operates to prevent energisation of the primary heater simultaneous with energisation of the secondary heater and the controller operates to energise the secondary heater during a portion of a dispense cycle after activating the pump during the same dispense cycle.

2. The method of claim 1 wherein the beverage preparation machine is operated to dispense a beverage during the dispense cycle from the brewer, wherein the controller operates to energise the primary heater during a portion of the dispense cycle when the pump of said brewer is inactive.

3. The method of claim 2 wherein the dispense cycle comprises one or more pauses where water is not pumped to said delivery head and wherein the controller operates to energise the primary heater during said one or more pauses.

4. The method of claim 3 wherein the one or more pauses are for steeping the one or more beverage ingredients of the cartridge.

5. The method of claim 1 wherein during the dispense cycle the primary and secondary heaters are energised alternately.

6. The method of claim 1 wherein during a dispense cycle the secondary heater is always energised and the primary heater is always de-energised.

7. The method of claim 1 further comprising heating the water in the reservoir to a temperature of between 70 and 95 degrees Celsius.

8. The method of claim 7 comprising heating the water in the reservoir to a temperature of approximately 85 degrees Celsius.

9. The method of claim 1 further comprising boosting the temperature of the water pumped to the delivery head by use of the secondary heater by between 0 and 30 degrees Celsius.

10. The method of claim 9 comprising boosting the temperature of the water pumped to the delivery head by use of the secondary heater such that the temperature of the water on reaching the delivery head is between 85 and 94 degrees Celsius.

11. The method of claim 1 further comprising passing steam through the delivery head after dispensation of a beverage from the brewer.

12. The method of claim 11 wherein the steam is generated by the secondary heater.

13. The method of claim 1 wherein the controller operates to energise the secondary heater after activating the pump to generate steam from water remaining in the secondary heater at an end of the dispense cycle.

14. The method of claim 1 wherein the controller operates to activate the pump at a beginning of the dispense cycle; and
   the controller operates to energise the secondary heater to heat pumped water to a predetermined temperature after activating the pump at the beginning of the dispense cycle.

* * * * *